(12) United States Patent
Itazu et al.

(10) Patent No.: US 11,643,351 B2
(45) Date of Patent: May 9, 2023

(54) METHOD AND APPARATUS FOR MANUFACTURING GLASS ARTICLE

(71) Applicant: Nippon Electric Glass Co., Ltd., Shiga (JP)

(72) Inventors: Hiroyuki Itazu, Shiga (JP); Kazuyuki Tenyama, Shiga (JP); Shusaku Tamamura, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 204 days.

(21) Appl. No.: 16/960,385

(22) PCT Filed: Jan. 15, 2019

(86) PCT No.: PCT/JP2019/000915
§ 371 (c)(1),
(2) Date: Jul. 7, 2020

(87) PCT Pub. No.: WO2019/146446
PCT Pub. Date: Aug. 1, 2019

(65) Prior Publication Data
US 2020/0354251 A1    Nov. 12, 2020

(30) Foreign Application Priority Data
Jan. 29, 2018  (JP) ............................. JP2018-012534

(51) Int. Cl.
*C03B 5/42* (2006.01)
*C03B 7/14* (2006.01)
(52) U.S. Cl.
CPC .................. *C03B 5/42* (2013.01); *C03B 7/14* (2013.01)

(58) Field of Classification Search
CPC .................................... C03B 5/42; C03B 7/14
See application file for complete search history.

(56) References Cited

U.S. PATENT DOCUMENTS

2014/0123710 A1* 5/2014 Lineman .................. C03B 5/16
65/135.1

FOREIGN PATENT DOCUMENTS

| CN | 104926083 | 9/2015 |
| CN | 106103363 | 11/2016 |

(Continued)

OTHER PUBLICATIONS

Machine Translation of CN 104926083 (Year: 2015).*
(Continued)

*Primary Examiner* — Cynthia Szewczyk
(74) *Attorney, Agent, or Firm* — Wenderoth, Lind & Ponack, L.L.P.

(57) ABSTRACT

In manufacturing a glass article (GR) by causing a molten glass (GM) to flow through a transfer pipe (12) and to be transferred, the transfer pipe (12) includes: a pipe end portion (14) being an end portion in a pipe axis direction; a pipe-shaped portion (15); and a joining portion (16) configured to join the pipe end portion (14) and the pipe-shaped portion (15) to each other. The pipe end portion (14) includes a flange portion (17) and a curved portion (18) extending from an inner peripheral end (17a) of the flange portion (17) toward the pipe-shaped portion (15) side and being reduced in diameter toward the pipe-shaped portion (15) side. The pipe end portion (14) is made of a material having a smaller creep rupture strength and/or a larger creep strain rate than the pipe-shaped portion (15) at 1,500° C. and 1,000 hours.

9 Claims, 4 Drawing Sheets

(56) References Cited

FOREIGN PATENT DOCUMENTS

| | | |
|---|---|---|
| JP | 2013-245134 | 12/2013 |
| JP | 2015-160799 | 9/2015 |
| JP | 2015-209366 | 11/2015 |

OTHER PUBLICATIONS

"Creep Properties of Platinum Metals and Alloys", Platinum Metals Rev., 1957, 1, (1), 23 (Year: 1957).*
Translation of JP 2015-160799 (Year: 2015).*
International Preliminary Report on Patentability and Written Opinion of the International Searching Authority dated Aug. 4, 2020 in International (PCT) Application No. PCT/JP2019/000915.
Office Action dated Jan. 13, 2022 in corresponding Chinese Patent Application No. 201980005913.3, along with English language translation of the Search Report.
International Search Report dated Mar. 19, 2019 in International (PCT) Application No. PCT/JP2019/000915.

* cited by examiner

METHOD AND APPARATUS FOR MANUFACTURING GLASS ARTICLE

TECHNICAL FIELD

The present invention relates to a manufacturing method for a glass article and a manufacturing apparatus therefor, and more particularly, to a manufacturing method for a glass article comprising a step of transferring molten glass by causing the molten glass to flow through a transfer pipe, and a manufacturing apparatus therefor.

BACKGROUND ART

As is well known, when a glass article is to be manufactured, molten glass is transferred from a melting furnace to a forming device for a glass article with use of a molten glass transfer device. A transfer pipe through which the molten glass flows is arranged in the middle of a path configured to transfer the molten glass.

The transfer pipe is used, for example, for allowing communication between the melting furnace and a fining tank, between the fining tank and a stirring tank, among a plurality of stirring tanks, and between the stirring tank and a pot (volume part mainly configured to adjust the viscosity). Further, the transfer pipe is used also for a main body of the fining tank.

In a molten glass transfer device using a transfer pipe of this type, due to temperature increase at the start-up, a transfer pipe is thermally expanded in a pipe axis direction, and breakage such as improper deformation or cracking of the transfer pipe may be caused. Therefore, it is preferred that the transfer pipe of this type have a structure capable of eliminating the influence of thermal expansion.

In Patent Literature 1, there is disclosed a transfer pipe (pipe member in the literature) in which a curved portion reduced in diameter toward a pipe-shaped portion side is interposed between a pipe-shaped portion having the same diameter over the entire length in a pipe axis direction and each of flange portions arranged at the vicinities of both ends of the pipe-shaped portion in the pipe axis direction. With use of the transfer pipe, thermal expansion in the pipe axis direction is absorbed by the curved portion, and it can be expected that improper deformation and breakage can be prevented.

CITATION LIST

Patent Literature 1: JP 2013-245134 A

SUMMARY OF INVENTION

Technical Problem

Incidentally, when the transfer pipe is thermally expanded in the pipe axis direction, the pipe-shaped portion is to extend in the pipe axis direction. Thus, a large stress acts particularly on the pipe-shaped portion in the pipe axis direction. In order to prevent breakage such as improper deformation or cracking of the pipe-shaped portion caused by thermal expansion of the transfer pipe, it is important to sufficiently absorb extension of the pipe-shaped portion in the pipe axis direction.

However, in the transfer pipe in which only the curved portion is interposed between the pipe-shaped portion and the flange portion as disclosed in Patent Literature 1, an effect of absorbing extension of the pipe-shaped portion in the pipe axis direction is not sufficient, and it is desired to further reduce a stress acting on the pipe-shaped portion.

In view of the above, the present invention has an object to further reduce a stress acting on a pipe-shaped portion by sufficiently absorbing extension of the pipe-shaped portion in a pipe axis direction when a transfer pipe is thermally expanded in the pipe axis direction.

Solution to Problem

According to one embodiment of the present invention which has been made in order to solve the above-mentioned problem, there is provided a manufacturing method for a glass article, comprising a step of transferring a molten glass by causing the molten glass to flow through a transfer pipe, wherein the transfer pipe comprises: a pipe end portion being an end portion in a pipe axis direction; a pipe-shaped portion; and a joining portion configured to join the pipe end portion and the pipe-shaped portion to each other, wherein the pipe end portion comprises: a flange portion; and a curved portion extending from an inner peripheral end of the flange portion toward the pipe-shaped portion side and being reduced in diameter toward the pipe-shaped portion side, and wherein the pipe end portion is made of a material having a smaller creep rupture strength and/or a larger creep strain rate than the pipe-shaped portion at 1,500° C. and 1,000 hours.

According to such a method, the material for forming the pipe end portion of the transfer pipe has a smaller creep rupture strength and/or a larger creep strain rate than the material for forming the pipe-shaped portion at 1,500° C. and 1,000 hours. Thus, the pipe end portion is more easily deformed than the pipe-shaped portion in a high temperature range. Therefore, when the transfer pipe is thermally expanded in the pipe axis direction, the flange portion being the pipe end portion and the curved portion are easily deformed so that extension of the pipe-shaped portion in the pipe axis direction is sufficiently absorbed, thereby being capable of reducing a stress acting on the pipe-shaped portion.

In this case, it is preferred that the pipe end portion further comprise an extending pipe-shaped portion continuous with an end portion of the curved portion on the pipe-shaped portion side and having the same diameter as the pipe-shaped portion.

With such a configuration, the pipe end portion that is easily deformed in the high temperature range further comprises the extending pipe-shaped portion continuous with the curved portion. Thus, a portion of the curved portion closer to the pipe-shaped portion side is more easily deformed by the presence of the extending pipe-shaped portion. With this, extension of the pipe-shaped portion in the pipe axis direction caused by thermal expansion can be absorbed more reliably. Further, the joining portion between the pipe end portion and the pipe-shaped portion is a portion in which the strength is particularly weak. Thus, there is a fear that, when the transfer pipe is thermally expanded in the pipe axis direction, breakage such as cracking starting from the joining portion may be caused. The pipe end portion comprises the extending pipe-shaped portion continuous with the curved portion. Accordingly, a stress generated in the joining portion can be reduced, and breakage (for example, cracking) starting from the joining portion can be prevented.

In the above-mentioned method, it is preferred that a reinforcing material be arranged on an outer periphery of the joining portion.

With such a configuration, the joining portion joining the pipe end portion and the pipe-shaped portion to each other is increased in strength with the reinforcing material. With this, breakage starting from the joining portion can be prevented more reliably.

In the above-mentioned method, the flange portion may be arranged in a vertical posture, and a pipe axis of the pipe-shaped portion may be inclined with respect to the flange portion.

With such a configuration, the transfer pipe can be used for a supply path configured to cause the molten glass to flow from a low place to a high place or from a high place to a low place. Thus, a countermeasure against thermal expansion of the transfer pipe can be taken in various supply paths.

Further, according to one embodiment of the present invention which has been made in order to solve the above-mentioned problem, there is provided a manufacturing apparatus for a glass article, which is configured to transfer a molten glass by causing the molten glass to flow through a transfer pipe, wherein the transfer pipe comprises: a pipe end portion being an end portion in a pipe axis direction; a pipe-shaped portion; and a joining portion configured to join the pipe end portion and the pipe-shaped portion to each other, wherein the pipe end portion comprises: a flange portion; and a curved portion extending from an inner peripheral end of the flange portion toward the pipe-shaped portion side and being reduced in diameter toward the pipe-shaped portion side, and wherein the pipe end portion is made of a material having a smaller creep rupture strength and/or a larger creep strain rate than the pipe-shaped portion at 1,500° C. and 1,000 hours.

According to such an apparatus, substantially the same actions and effects as those of the manufacturing method for a glass article according to the present invention described at the beginning can be obtained.

Advantageous Effects of Invention

According to the present invention, when the transfer pipe is thermally expanded in the pipe axis direction, extension of the pipe-shaped portion in the pipe axis direction is sufficiently absorbed so that improper deformation or breakage of the pipe-shaped portion is reliably prevented. With this, the molten glass is smoothly transferred when the glass article is to be manufactured.

DESCRIPTION OF EMBODIMENTS

Now, a manufacturing method for a glass article and a manufacturing apparatus for carrying out the method according to an embodiment of the present invention is described with reference to the accompanying drawings.

Figure 1:
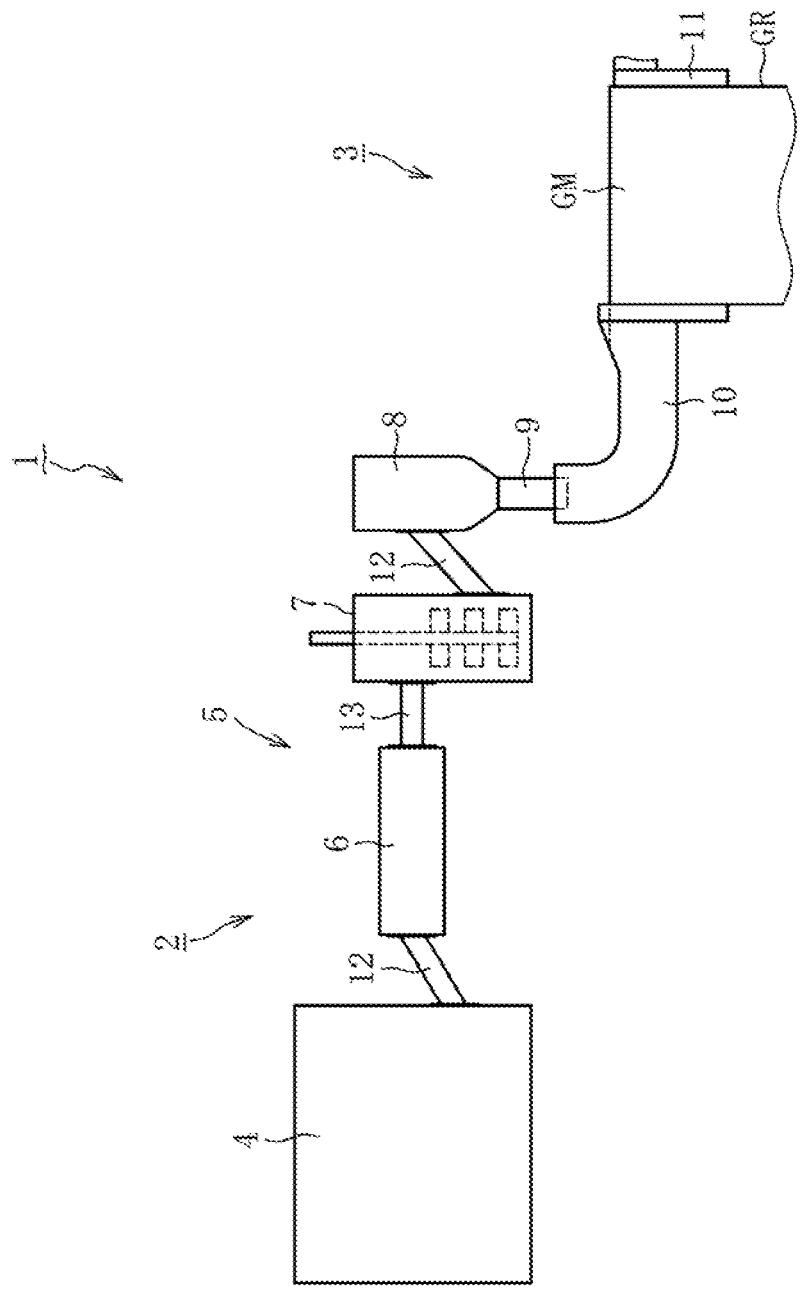
FIG. 1 is a schematic side view for illustrating an overall configuration of a manufacturing method for a glass article and a manufacturing apparatus for carrying out the method according to an embodiment of the present invention.

As illustrated in FIG. 1, a manufacturing apparatus 1 for a glass article roughly comprises a molten glass transfer device 2 and a forming device 3. The molten glass transfer device 2 is configured to transfer molten glass. The forming device 3 is configured to form a glass sheet GR from the molten glass. The molten glass transfer device 2 comprises a supply path 5 configured to supply a molten glass GM from a melting furnace (melting kiln) 4 arranged at an upstream end to the forming device 3 arranged at a downstream end. In the supply path 5, there are arranged, in the order from an upstream side, a fining tank 6, one or a plurality (one in the example of the figure) of stirring tanks 7, and a pot (volume part mainly configured to adjust the viscosity of the molten glass GM). A downstream side of the pot 8 communicates with a forming trough 11 of the forming device 3 through a small-diameter pipe 9 and a large-diameter pipe 10.

The forming device 3 is configured to form the band-shaped glass sheet GR from the molten glass GM by an overflow down-draw method. Specifically, the forming trough 11 of the forming device 3 has a substantially wedge shape in cross section (cross section perpendicular to the drawing sheet of FIG. 1), and has an overflow groove (not shown) formed in an upper portion thereof. The forming trough 11 is configured to cause the molten glass GM to overflow from the overflow groove, and then to cause the molten glass GM to flow down along both side wall surfaces of the forming trough 11 (side wall surfaces located on front and back surface sides of the drawing sheet). Further, the forming trough 11 is configured to cause the molten glass GM having flowed down to join each other at lower end portions of the side wall surfaces so that the molten glass GM is formed into a sheet shape.

The band-shaped glass sheet GR thus formed is subjected to an annealing step and a cutting step described later, and glass sheets having desired dimensions are cut out. The glass sheet being a glass article obtained as described above has a thickness of, for example, from 0.01 mm to 2 mm, and is utilized for a flat panel display, such as a liquid crystal display or an OLED display, a substrate of an OLED illumination or a solar cell, or a protective cover. The forming device 3 may be used for performing any other down-draw method such as a slot down-draw method, and may be used for performing methods other than the down-draw method, for example, a float method.

As glass of the sheet glass GR, silicate glass or silica glass is used, borosilicate glass, soda lime glass, aluminosilicate glass, or chemically tempered glass is preferably used, and alkali-free glass is most preferably used. The "alkali-free glass" refers to glass substantially free of an alkaline component (alkali metal oxide), and specifically refers to glass having a weight ratio of an alkaline component of 3,000 ppm or less. In the present invention, the weight ratio of the alkaline component is preferably 1,000 ppm or less, more preferably 500 ppm or less, most preferably 300 ppm or less.

Transfer pipes 12 and 13 allow communication between the melting furnace 4 and the fining tank 6, between the fining tank 6 and the stirring tank 7, and between the stirring tank 7 and the pot 8 in the supply path 5, respectively. More specifically, the transfer pipes 12 inclined upward toward the downstream side allow communication between the melting furnace 4 and the fining tank 6 and between the stirring tank 7 and the pot 8. The non-inclined transfer pipe 13 allows communication between the fining tank 6 and the stirring tank 7. The molten glass GM is transferred to the downstream side while flowing through those transfer pipes 12 and 13. As a main body of the fining tank 6, the non-inclined transfer pipe 13 may be used.

Figure 2:
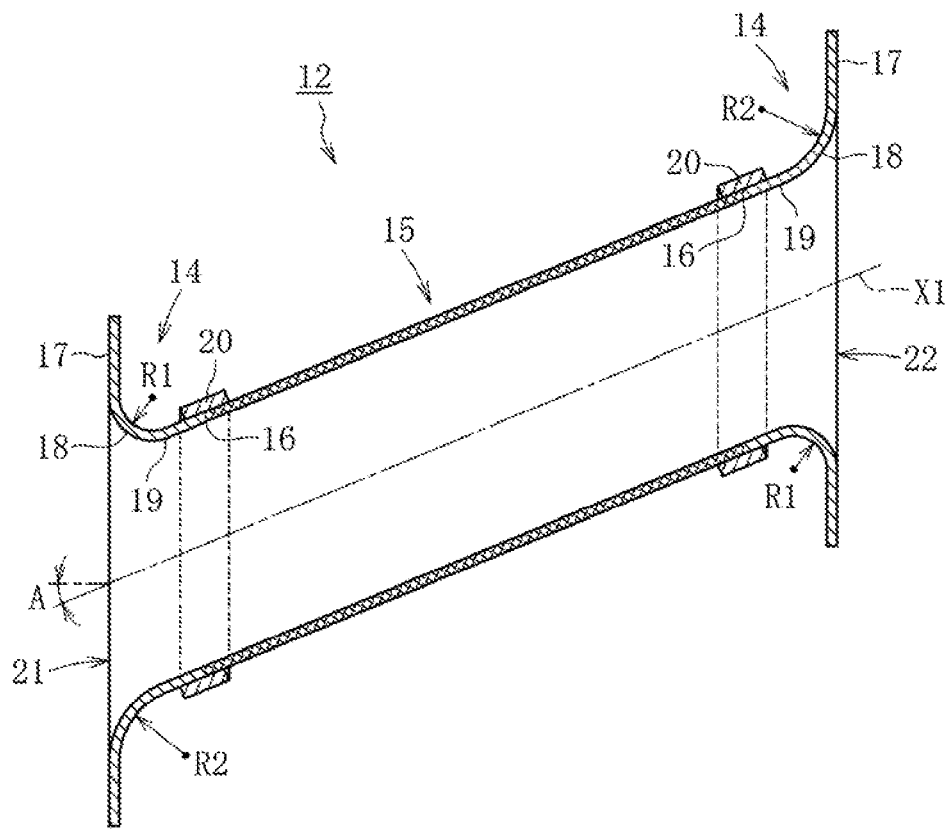
FIG. 2 is a longitudinal sectional side view for illustrating a transfer pipe used in the manufacturing method for a glass article and the manufacturing apparatus for carrying out the method according to the embodiment of the present invention.
Figure 3:
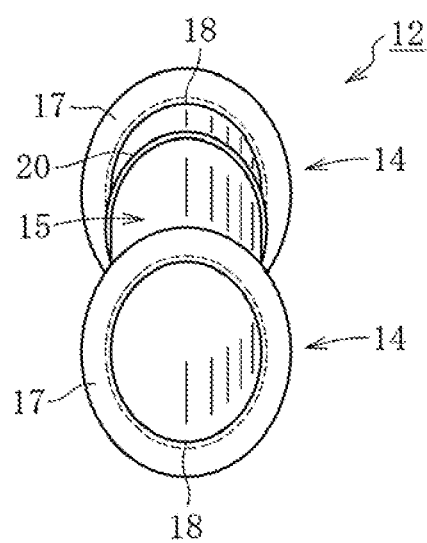
FIG. 3 is a front view for illustrating the transfer pipe used in the manufacturing method for a glass article and the manufacturing apparatus for carrying out the method according to the embodiment of the present invention.

FIG. 2 and FIG. 3 are illustrations of the transfer pipe 12 inclined upward toward the downstream side among those two types of the transfer pipes 12 and 13. As illustrated in FIG. 2 and FIG. 3, the transfer pipe 12 is obtained by joining pipe end portions 14 and a pipe-shaped portion 15 through joining portions 16. The pipe end portions 14 are both end portions of the transfer pipe 12 in a direction along a pipe axis X1 (pipe axis direction). The pipe-shaped portion 15 has a cylindrical shape having the same diameter over the entire length in the pipe axis direction. The pipe end portions 14 each comprise a flange portion 17 having an annular shape, a curved portion 18 extending toward an inner peripheral side of the flange portion 17, and an extending pipe-shaped portion 19 having a cylindrical shape. A reinforcing material 20 is arranged over the entire outer periphery of the joining portion 16. An inclination angle A with respect to a horizontal plane of the pipe axis X1 is, for example, 3° to 30°.

Peripheral portions of a lower end 21 in the pipe axis direction and peripheral portions of an upper end 22 in the pipe axis direction have the same structure. The following detailed description is given of only the peripheral portions of the lower end 21 in the pipe axis direction of the transfer pipe 12 for convenience.

Figure 4:
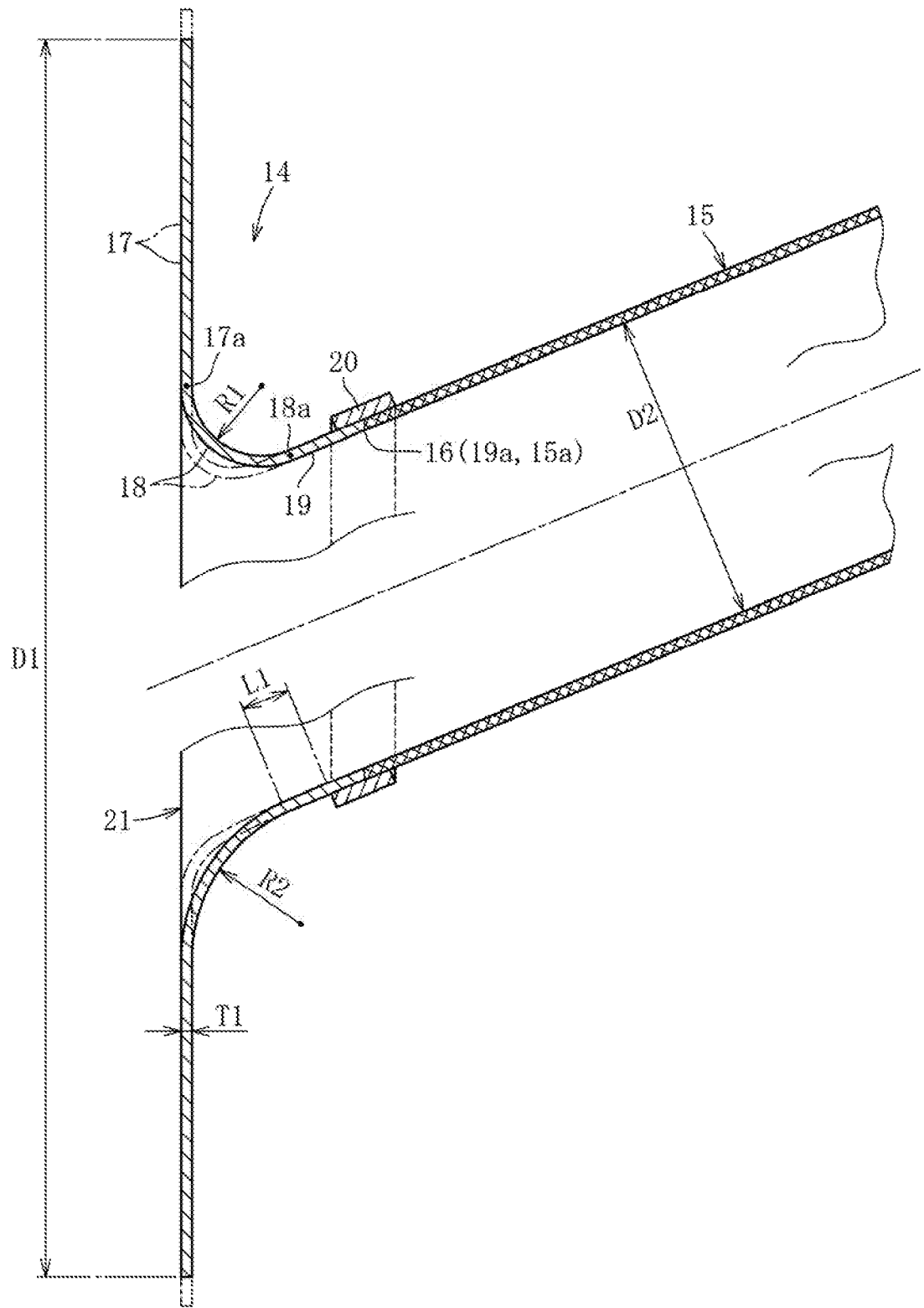
FIG. 4 is an enlarged longitudinal sectional side view for illustrating a main part of the transfer pipe used in the manufacturing method for a glass article and the manufacturing apparatus for carrying out the method according to the embodiment of the present invention.

As illustrated in FIG. 4, the pipe end portion 14 comprises the flange portion 17 and the curved portion 18. The flange portion 17 is in a vertical posture and is formed of an annular flat plate. The curved portion 18 extends from an inner peripheral end 17a of the flange portion 17 toward the pipe-shaped portion 15 side, and is reduced in diameter toward the pipe-shaped portion 15 side. Further, the pipe end portion 14 comprises the extending pipe-shaped portion 19 that is continuous with an end portion 18a of the curved portion 18 on the pipe-shaped portion 15 side and has the same diameter as pipe-shaped portion 15. An end portion 19a of the extending pipe-shaped portion 19 on the pipe-shaped portion 15 side is continuous with an end portion 15a of the pipe-shaped portion 15 on the extending pipe-shaped portion 19 side at the joining portion 16. In FIG. 4, the pipe end portion 14 is hatched with the diagonal lines, and the pipe-shaped portion 15 is cross-hatched (the same applies to FIG. 2). The reinforcing material 20 is obtained by winding a band-shaped sheet material around the outer periphery of the joining portion 16, and has a cylindrical shape.

Here, the material for forming the flange portion 17, the curved portion 18, and the extending pipe-shaped portion 19, which are the pipe end portion 14, has a smaller creep rupture strength and/or a larger creep strain rate than the material for forming the pipe-shaped portion 15 at 1,500° C. and 1,000 hours. Specifically, the pipe end portion 14 and the pipe-shaped portion 15 satisfy at least one of the following two characteristics (1) and (2). (1) The material for forming the pipe end portion 14 has a smaller creep rupture strength than the material for forming the pipe-shaped portion 15 at 1,500° C. and 1,000 hours. (2) The material for forming the pipe end portion 14 has a larger creep strain rate than the material for forming the pipe-shaped portion 15 at 1, 500° C. and 1,000 hours. As an example, the pipe end portion 14 is made of platinum or a platinum alloy, and the pipe-shaped portion 15 is made of reinforced platinum or a reinforced platinum alloy obtained by dispersing zirconia in platinum or a platinum alloy so that both the materials 14 and 15 have the characteristics described above. Further, as another example, both the pipe end portion 14 and the pipe-shaped portion 15 are made of platinum, a platinum alloy, reinforced platinum, or a reinforced platinum alloy, and, for example, the content of rhodium is set different between the pipe end portion 14 and the pipe-shaped portion 15 so that both the materials 14 and 15 have the characteristics described above. The materials for forming the pipe end portion 14 and the pipe-shaped portion 15 are not limited to those, and it is only required that the material for forming the pipe end portion 14 has the smaller creep rupture strength and/or the larger creep strain rate than the material for forming the pipe-shaped portion 15. When, similarly to the pipe end portion 14, the pipe-shaped portion 15 is made of the material having the smaller creep rupture strength and/or the larger creep strain rate, the relative strength of the pipe-shaped portion 15 with respect to the pipe end portion 14 is reduced, with the result that breakage such as improper deformation or cracking of the pipe-shaped portion 15 is liable to occur due to thermal expansion.

In this embodiment, the joining portion 16 is a portion formed by butt-welding the pipe end portion 14 and the pipe-shaped portion 15 to each other. It is preferred that the reinforcing material 20 arranged on the outer periphery of the joining portion 16 be made of the same material as the pipe-shaped portion 15, but the material is not particularly limited as long as the material can reinforce the joining portion 16. Further, the reinforcing material 20 of this embodiment is fixed to the pipe end portion 14 and the pipe-shaped portion 15 by welding, but the reinforcing material 20 may be arranged on the outer periphery of the joining portion 16 by any other method as long as the reinforcing material 20 can exhibit the function.

A curvature radius of the curved portion 18 is gradually reduced from a lower end to an upper end of the curved portion 18. A curvature radius R1 of the curved portion 18 at the upper end position is, for example, 2 mm to 20 mm, preferably, 5 mm to 10 mm. A curvature radius R2 of the curved portion 18 at the lower end position is, for example, 3 mm to 30 mm, preferably, 10 mm to 20 mm. The relationship of R1<R2 is satisfied. The difference between R1 and R2 is, for example, 1 mm to 10 mm, preferably, 5 mm to 10 mm.

A thickness T1 of the flange portion 17, the curved portion 18, the extending pipe-shaped portion 19, and the pipe-shaped portion 15 is, for example, 0.3 mm to 3 mm. A length L1 of the extending pipe-shaped portion 19 in the pipe axis direction is, for example, 5 mm to 20 mm, preferably, 10 mm to 15 mm. An inner diameter D2 of the pipe-shaped portion 15 is, for example, 10 mm to 300 mm. An outer diameter D1 (mm) of the flange portion 17 is, for example, (D2+100) to (D2+300).

The above description relates to the structure of the peripheral portions of the lower end 21 of the transfer pipe 12, and the structure of the peripheral portions of the upper end 22 of the transfer pipe 12 is substantially the same. More specifically, as illustrated in FIG. 2, also regarding the peripheral portions of the upper end 22 of the transfer pipe 12, the pipe end portion 14 comprising the flange portion 17, the curved portion 18, and the extending pipe-shaped portion 19, and the pipe-shaped portion 15 are joined to each other through the joining portion 16, and the reinforcing material 20 is arranged on the outer periphery of the joining portion 16. The materials of the portions are the same as those of the peripheral portions of the lower end 21 described above. As a difference, a curvature radius of the curved portion 18 in the peripheral portions of the upper end 22 of the transfer pipe 12 is gradually increased from the lower end to the upper end of the curved portion 18. Thus, a curvature radius at the lower end corresponds to R1 above, and a curvature radius at the upper end corresponds to R2 above.

Figure 5:
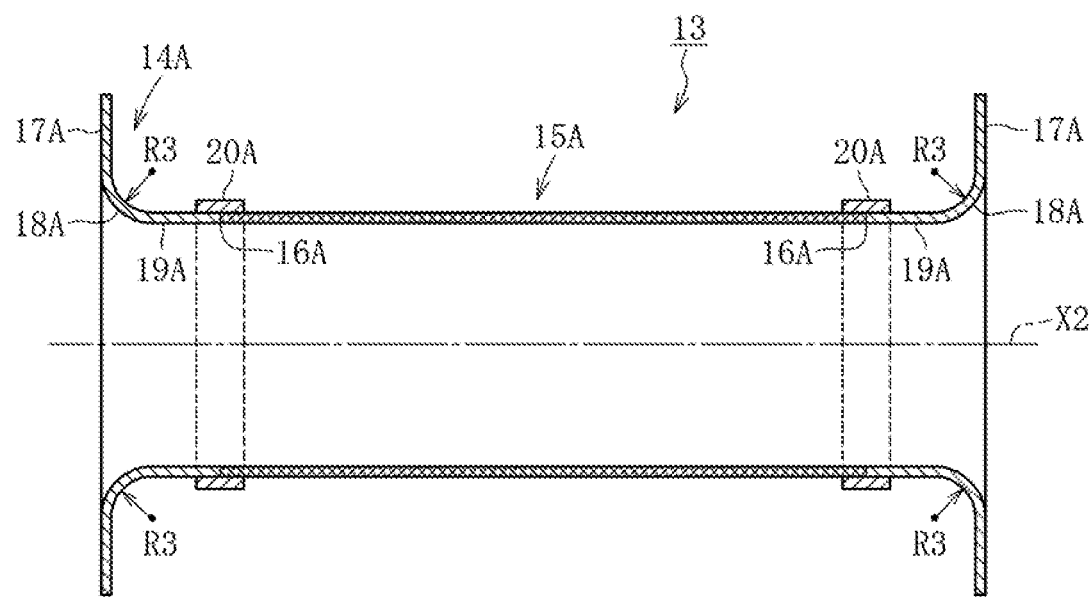
FIG. 5 is a longitudinal sectional side view for illustrating another example of the transfer pipe used in the manufacturing method for a glass article and the manufacturing apparatus for carrying out the method according to the embodiment of the present invention.

Further, in this embodiment, the non-inclined transfer pipe 13 illustrated in FIG. 1, specifically, the transfer pipe 13 whose pipe axis X2 is not inclined with respect to a flange portion 17A in a vertical posture as illustrated in FIG. 5 has substantially the same feature as the transfer pipe 12 described above. Specifically, as illustrated in FIG. 5, the non-inclined transfer pipe 13 is obtained by joining pipe end portions 14A and a pipe-shaped portion 15A through joining portions 16A. The pipe end portions 14A are both end portions of the transfer pipe 13 in the pipe axis direction. The pipe-shaped portion 15A has the same diameter over the entire length in the pipe axis direction. Reinforcing materials 20A are arranged on outer peripheries of the joining portions 16A. The pipe end portion 14A comprises the flange portion 17A, a curved portion 18A, and an extending pipe-shaped portion 19A, and the joining portion 16A is interposed by welding between the extending pipe-shaped portion 19A and the pipe-shaped portion 15A. The materials and the dimensions of the flange portion 17A, the curved portion 18A, the extending pipe-shaped portion 19A, the joining portion 16A, and the pipe-shaped portion 15A are the same as those of the transfer pipe 12 described above. As a difference, a curvature radius R3 of the curved portion 18A in the transfer pipe 13 is the same over the entire periphery.

Figure 6:
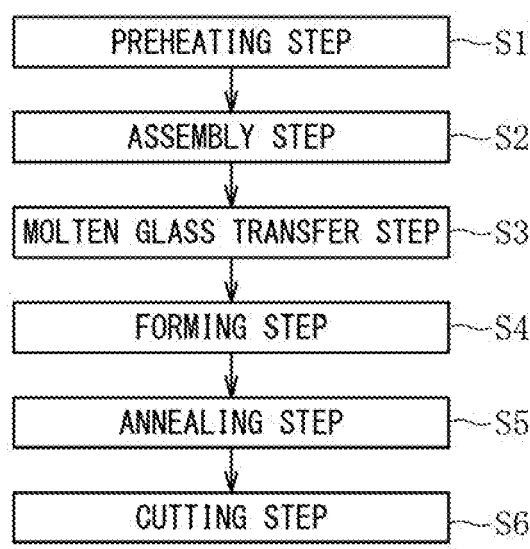
FIG. 6 is a flowchart for illustrating a procedure of the manufacturing method for a glass article according to the embodiment of the present invention.

Next, a method of manufacturing a glass article (glass sheet GR) through use of the manufacturing apparatus 1 having the configuration described above is described. As illustrated in FIG. 6, the manufacturing method comprises a preheating step S1, an assembly step S2, a molten glass transfer step S3, a forming step S4, an annealing step S5, and a cutting step S6.

In the preheating step S1, the transfer pipes 12 and 13, the stirring tank 7, and the pot 8 of the molten glass transfer device 2 illustrated in FIG. 1 are heated by a heating device (not shown) under a state in which those are separated from each other. In this case, the transfer pipes 12 and 13 are energized via electrodes provided on the flange portions 17 and 17A. At this time, for example, air is filled without causing the molten glass GM to flow through the transfer pipes 12 and 13. When the pipe-shaped portions 15 and 15A of the transfer pipes 12 and 13 reach a predetermined preheating temperature (for example, 1,200° C. to 1,400° C.), the subsequent assembly step S2 is carried out.

In the assembly step S2, the flange portions 17 and 17A of the transfer pipes 12 and 13 are fixed to the side wall of the melting furnace 4, the fining tank 6, the stirring tank 7, or the pot 8, or the flange portions 17 and 17A of the transfer pipes 12 and 13 are fixed to each other. Finally, the melting furnace 4, the fining tank 6, the stirring tank 7, the pot 8, the small-diameter pipe 9, the large-diameter pipe 10, the forming device 3, and the like are connected to each other so that the manufacturing apparatus 1 is assembled. In this manner, the assembly step S2 is terminated.

In the molten glass transfer step S3, a glass raw material supplied into the melting furnace 4 is heated to produce the molten glass GM, and the molten glass GM is sequentially transferred to the fining tank 6 through the transfer pipe 12. A fining agent is blended in the glass raw material, and gas (bubbles) is generated in the molten glass GM by an action of the fining agent. The gas is removed by causing the molten glass GM to flow through the fining tank 6. Further, the molten glass GM from the fining tank 6 is transferred to the forming device 3 through the transfer pipes 12 and 13, the stirring tank 7, and the pot 8.

In the molten glass transfer step S3 immediately after the assembly step S2 (at the start-up of the manufacturing apparatus 1), the temperature of the transfer pipes 12 and 13 increases along with the start of transfer of the molten glass GM, and reaches, for example, 1,400° C. to 1,650° C. Therefore, the transfer pipes 12 and 13 are thermally expanded in the pipe axis direction.

In this case, when the pipe-shaped portion 15 of the transfer pipe 12 illustrated in FIG. 2 to FIG. 4 is to extend in the pipe axis direction in accordance with the thermal expansion, as indicated by the chain line in FIG. 4, the curved portion 18 is deformed so that the curvature radii R1 and R2 are reduced, and the flange portion 17 is deformed so that the outer diameter D1 is increased. With this, extension of the pipe-shaped portion 15 in the pipe axis direction is sufficiently absorbed, thereby being capable of preventing breakage such as improper deformation or cracking of the pipe-shaped portion 15. Such a phenomenon occurs because the material for forming the flange portion 17 and the curved portion 18 has a smaller creep rupture strength and/or a larger creep strain rate than the material for forming the pipe-shaped portion 15 at 1,500° C. and 1,000 hours.

Here, the pipe-shaped portion 15 has a property of being harder and brittler than the pipe end portion 14. Thus, when the flange portion 17 is made of the same material as the pipe-shaped portion 15 and is directly connected to the pipe-shaped portion 15, extension of the pipe-shaped portion 15 in the pipe axis direction cannot be properly absorbed. However, the flange portion 17 as well as the curved portion 18 are made of the material having the smaller creep rupture strength and/or the larger creep strain rate than the pipe-shaped portion 15. Therefore, with the cooperation action of the flange portion 17 and the curved portion 18, an effect of absorbing extension of the pipe-shaped portion 15 in the pipe axis direction becomes sufficient.

The curved portion 18 is continuous with the extending pipe-shaped portion 19 made of the material having the smaller creep rupture strength and/or the larger creep strain rate. Therefore, with the cooperation action of the extending pipe-shaped portion 19 and the curved portion 18, specifically, the cooperation action of the extending pipe-shaped portion 19, the curved portion 18, and the flange portion 17, the effect of absorbing extension of the pipe-shaped portion 15 in the pipe axis direction is further increased.

The joining portions 16 are portions in which the strength is particularly weak and a large stress acts when the pipe-shaped portion 15 is to extend in the pipe axis direction. When the extending pipe-shaped portion 19 is interposed between the curved portion 18 and the joining portion 16, the deformation amount of the joining portion 16 can be reduced, and a stress generated in the joining portion 16 can be reduced as compared to a case in which the extending pipe-shaped portion 19 is not interposed. Therefore, breakage (for example, cracking) starting from the joining portion can be prevented. In addition, the joining portion 16 is sufficiently increased in strength with the reinforcing material 20. Therefore, breakage of the transfer pipe 12 starting from the joining portion 16 can be more reliably prevented.

The above-described action and effect can also be obtained in the same manner as for the non-inclined transfer pipe 13 illustrated in FIG. 5.

The inclined transfer pipe 12 illustrated in FIG. 4 is connected to the volume part such as the melting furnace 4 or the stirring tank 7 with the lower end 21 being the upstream end. In the transfer pipe 12, the curvature radius R2 of the curved portion 18 at the lower end position is larger than the curvature radius R1 of the curved portion 18 at the upper end position. Therefore, the molten glass in the volume part smoothly flows into the transfer pipe 12, and further, it is advantageous in receiving a load of the molten glass. Further, the degree of easiness of deformation of the flange portion 17 and the curved portion 18 is smaller on the lower portion side on which the curvature radius R2 is larger than that on the upper portion side. Also with this, the molten glass smoothly flows into the transfer pipe 12 at the thermal expansion.

The molten glass GM having been subjected to the molten glass transfer step S3 described above flows into the overflow groove of the forming trough 11 of the forming device 3. In the forming step S4, the molten glass GM is formed into the glass sheet GR by an overflow down-draw method.

After that, the band-shaped glass sheet GR is subjected to the annealing step S5 with an annealing furnace and the cutting step S6 with a cutting device to be cut out into glass sheets having desired dimensions. Alternatively, after both ends of the band-shaped glass sheet GR in a width direction are continuously removed in the cutting step S6, the band-shaped glass sheet GR may be taken up into a roll shape (take-up step). As a result of the steps described above, manufacture of the glass article (glass sheet GR) is completed.

In the embodiment described above, the present invention is applied to the transfer pipes 12 inclined upward toward the downstream side and the non-inclined transfer pipe 13. However, the present invention can be similarly applied to a transfer pipe inclined downward toward the downstream side (in which the left side of the drawing sheet corresponds to the downstream side in the transfer pipe 12 illustrated in FIG. 2).

Further, in the embodiment described above, the present invention is applied to the peripheral portions of both the end portions of the transfer pipes 12 and 13 in the pipe axis direction. However, the present invention may be applied to only peripheral portions of one end portions of the transfer pipes 12 and 13 in the pipe axis direction (in particular, only the peripheral portions of the lower end 21 of the transfer pipe 12 illustrated in FIG. 4).

Further, in the embodiment described above, the pipe-shaped portions 15 and 15A of the transfer pipes 12 and 13 have the same diameter over the entire length in the pipe axis direction. However, the present invention may be similarly applied to a pipe-shaped portion formed of a taper pipe gradually reduced in diameter toward one side in the pipe axis direction.

Further, in the embodiment described above, as the glass article, a glass sheet and a glass roll are manufactured, but the glass article may be a glass pipe, glass fibers, or the like.

REFERENCE SIGNS LIST

1 manufacturing apparatus for glass article
12, 13 transfer pipe
14 pipe end portion
14A pipe end portion
15 pipe-shaped portion
15A pipe-shaped portion
16 joining portion
16A joining portion
17 flange portion
17A flange portion
17a inner peripheral end of flange portion
18 curved portion
18A curved portion
19 extending pipe-shaped portion
19A extending pipe-shaped portion
20 reinforcing material
20A reinforcing material
GM molten glass
GR glass sheet (glass article)
S3 molten glass transfer step
X1 pipe axis
X2 pipe axis

The invention claimed is:

1. A manufacturing method for a glass article, the manufacturing method comprising a step of transferring a molten glass by causing the molten glass to flow through a transfer pipe,
    wherein the transfer pipe comprises:
        a pipe end portion being an end portion in a pipe axis direction;
        a pipe-shaped portion; and
        a joining portion configured to join the pipe end portion and the pipe-shaped portion to each other,
    wherein the pipe end portion and the pipe-shaped portion are continuous in the pipe axis direction by an end portion of the pipe end portion in the pipe axis direction and an end portion of the pipe-shaped portion in the pipe axis direction joined at the joining portion,
    wherein the pipe end portion comprises:
        a flange portion; and
        a curved portion extending from an inner peripheral end of the flange portion toward a pipe-shaped portion side, the curved portion having both inner and outer surfaces reduced in diameter toward the pipe-shaped portion side,
    wherein the pipe end portion is made of a material having a smaller creep rupture strength and/or a larger creep strain rate than the pipe-shaped portion at 1,500° C. and 1,000 hours, and
    wherein the transfer pipe absorbs an extension of the pipe-shaped portion in the pipe axis direction caused by thermal expansion of the transfer pipe in the pipe axis direction by deformation of the curved portion.

2. The manufacturing method for a glass article according to claim 1, wherein the pipe end portion further comprises an extending pipe-shaped portion continuous with an end portion of the curved portion on the pipe-shaped portion side and having the same diameter as the pipe-shaped portion.

3. The manufacturing method for a glass article according to claim 2, wherein the transfer pipe further comprises a reinforcing material arranged on an outer periphery of the joining portion.

4. The manufacturing method for a glass article according to claim 3, wherein the flange portion is arranged in a vertical posture, and a pipe axis of the pipe-shaped portion is inclined with respect to the flange portion.

5. The manufacturing method for a glass article according to claim 2, wherein the flange portion is arranged in a vertical posture, and a pipe axis of the pipe-shaped portion is inclined with respect to the flange portion.

6. The manufacturing method for a glass article according to claim 1, wherein the transfer pipe further comprises a reinforcing material arranged on an outer periphery of the joining portion.

7. The manufacturing method for a glass article according to claim 6, wherein the flange portion is arranged in a vertical posture, and a pipe axis of the pipe-shaped portion is inclined with respect to the flange portion.

8. The manufacturing method for a glass article according to claim 1, wherein the flange portion is arranged in a vertical posture, and a pipe axis of the pipe-shaped portion is inclined with respect to the flange portion.

9. A manufacturing apparatus for a glass article, which is configured to transfer a molten glass by causing the molten glass to flow through a transfer pipe,
  wherein the transfer pipe comprises:
    a pipe end portion being an end portion in a pipe axis direction;
    a pipe-shaped portion; and
    a joining portion configured to join the pipe end portion and the pipe-shaped portion to each other,
  wherein the pipe end portion and the pipe-shaped portion are continuous in the pipe axis direction by an end portion of the pipe end portion in the pipe axis direction and an end portion of the pipe-shaped portion in the pipe axis direction joined at the joining portion,
  wherein the pipe end portion comprises:
    a flange portion; and
    a curved portion extending from an inner peripheral end of the flange portion toward a pipe-shaped portion side, the curved portion having both inner and outer surfaces reduced in diameter toward the pipe-shaped portion side,
  wherein the pipe end portion is made of a material having a smaller creep rupture strength and/or a larger creep strain rate than the pipe-shaped portion at 1,500° C. and 1,000 hours, and
  wherein the transfer pipe absorbs an extension of the pipe-shaped portion in the pipe axis direction caused by thermal expansion of the transfer pipe in the pipe axis direction by deformation of the curved portion.

* * * * *